July 26, 1966
H. THEVENON
3,263,020
HIGH VOLTAGE POWER CABLE INSULATED BY IMPREGNATED
SYNTHETIC MATERIAL AND METHOD
Filed Sept. 27, 1963
2 Sheets-Sheet 1
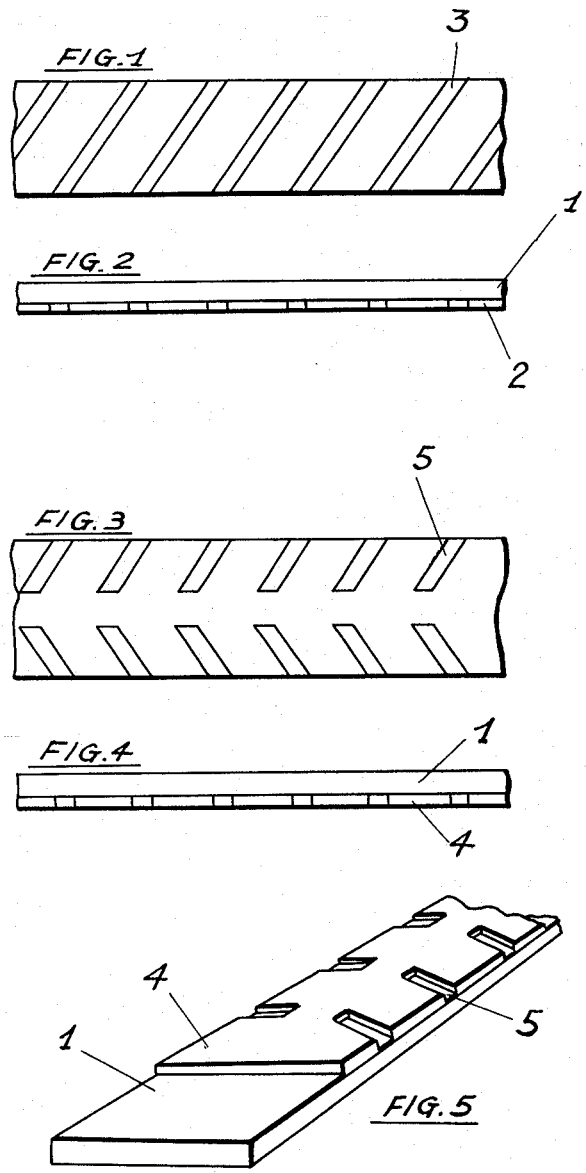
INVENTOR
Henri Thevenon
By Paul M. Craig, Jr.
ATTORNEY

United States Patent Office 3,263,020
Patented July 26, 1966

3,263,020
HIGH VOLTAGE POWER CABLE INSULATED BY IMPREGNATED SYNTHETIC MATERIAL AND METHOD
Henri Thevenon, Lyon, France, assignor to Compagnie Generale d'Electricite, Paris, France
Filed Sept. 27, 1963, Ser. No. 312,152
Claims priority, application France, Oct. 13, 1962, 912,192
12 Claims. (Cl. 174—25)

It is of great advantage to replace the winding paper habitually used to insulate high tension electrical cables with winding tape made of synthetic materials. Winding tape in carefully selected synthetic materials can result in dielectric losses which can be several times less than those of paper. The dielectric strength of winding tape made out of synthetic materials can be greater than that of paper tape. The mechanical qualities of synthetic materials, such as their breaking strength and their stretch, are very clearly greater than those of paper.

Up to the present, however, great difficulties have been encountered in obtaining proper impregnation of cables insulated with synthetic tapes by reason of the impermeability of these tapes. It has been found necessary to arrange oil circulation ducts to enable introduction of the impregnating fluid within the taped insulation in the joints between adjacent spirals of tape.

Such ducts have, in particular, been constituted within the thickness of the tape itself, the machining however, of ducting of such small depth, of the order of several tens of microns, remains doubtful. Ducting by means of spacers between layers has also been considered but this arrangement results in loss of dielectric material and resistance to insulation breakdown is weakened.

The present invention is for the purpose of avoiding this disadvantage. Its aim is the improvement of electrical cables by impregnation of an insulating fluid within synthetic insulating material in layers, these improvements being characterized by the fact that the insulation consists of composite tape formed of at least two superimposed parts and, adhering the one to the other, with at least one layer possessing notches which constitute ducts leading to the joints between the consecutive spirals of a same layer.

Other characteristics of the invention will appear from the following description of embodiments and the attached drawings on which:

FIGURES 1 and 2 are views from below and in profile of a composite tape according to the invention.

FIGURES 3 and 4 are similar views of a variation of this invention.

FIGURE 5 shows a view in perspective of the tape shown on FIGURES 3 and 4.

Figure 6:
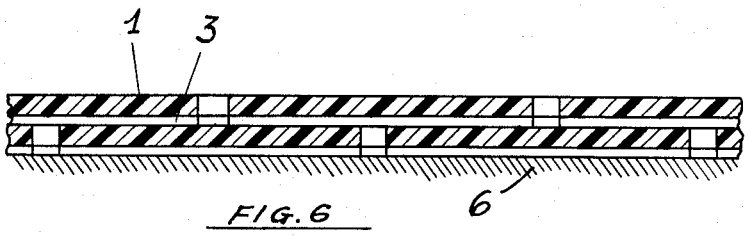
FIGURE 6 is a longitudinal section of layers of tape similar to that shown on FIGURES 1 and 2.

In the example of FIGURES 1 and 2, the composite tape consists of a smooth tape 1 in synthetic material acting as a support, on one surface of which are glued parallelograms 2 which are cut out of a second tape of synthetic material and which are juxta-positioned, one after the other, leaving transversal ducts 3 between each of them, the width of which can be very small. Furthermore, this layout enables giving the ducts 3 a slope relative to the composite tape which is capable of increasing the outlet line thus ensuring resistance to insulation breakdown as a result of shorting past tape.

In order to facilitate manufacture of composite tape, this may consist of, as in the example shown in FIGURES 3 to 5, a supporting tape 1 in synthetic material on one surface of which is glued a second tape of synthetic material with transversal notches 5 opening on to both its sides or on to one side alone so as to form ducts. This notched tape 4 may be of a thickness equal to or less than that of the supporting tape 1 and the width of notches can be very small so that the ducts formed by the notches 5 only very slightly reduce the dielectric insulation material.

Adhesion between superimposed sections of composite tape may be effected by an adhesive or by heat fusion.

Figure 7:
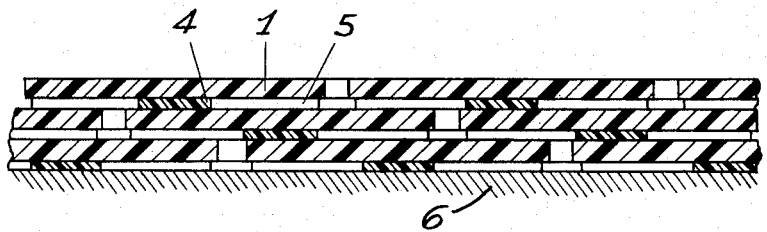
FIGURE 7 is a longitudinal section of layers of tape similar to that shown on FIGURES 3 and 4.

Despite the small loss of material, the effecting of insulation by means of such composite tapes enables much improved impregnation as a result of the communication established by the forementioned ducts as appears from the insulation by layer shown on FIGURES 6 and 7 wherein the reference character 6 designates the central conductor of the cable.

In order to give more clarity to FIGURE 6, it has been assumed that the transversal ducts in tapes of the type shown on FIGURES 1 and 2 have a slope such that their axes become almost parallel to the cable axis after winding of the tape. Similarly, in FIGURE 7, the notches in the tape of the type shown in FIGURES 3 to 5 are laid out so as to obtain ducts which are similarly disposed.

In the case of insulation according to the example shown in FIGURE 7, it is better to effect offsetting between that part of a tape 4 and the joint with the lower layer so that the latter is not covered by this smooth part. As may be ascertained in this figure, short passages are then established between joints of consecutive layers.

It will be understood that the dimensions of ducts shown have been chosen solely to facilitate the understanding of the drawings. Their width, in particular may be very small and of the order of a few tenths of a millimeter. Loss of dielectric material can, thus, be much reduced. It may be equal to or less than that which is due to joints between spirals of tape or about 3 to 5%.

I claim:

1. In an electrical high-power cable having a central conductor and insulating means comprising a plurality of layers of a composite tape wrapped helically around said conductor in such a manner that a joint exists between two consecutive turns of the composite tape,
   the improvement essentially consisting of a composite tape assembly including a first tape of impervious synthetic material having essentially oblong oblique notches, the width of which is smaller than that of said joint, a second tape of impervious synthetic material, the thicknss of which is at least equal to that of said first tape, and said first tape being superimposed upon and bonded to said second tape.

2. In an electrical high-power cable having a central conductor and insulating means comprising a plurality of layers of a composite tape wrapped helically around said conductor in such a manner that a joint exists between two consecutive turns of the composite tape.
   the improvement essentially consisting of a composite assembly tape including a first tape of impervious synthetic material having essentially oblong notches disposed obliquely to the axis of said first tape, each of said notches being extended to one of the edges of the tape,
   a second tape of impervious synthetic material,
   said first and second tapes being superimposed and secured together.

3. In an electrical high-power cable having a central conductor and insulating means comprising a plurality of layers of a composite tape wrapped helically around said conductor in such a manner that a joint exists between two consecutive turns of the composite tape, the improvement essentially consisting of a composite tape structure including a first tape of impervious synthetic material having essentially oblong notches disposed obliquely to the axis of said first tape, each of said notches being extended to one of the edges of the tape, and said first tape being uninterrupted and thus devoid of notches within the area of a longitudinal central part substantially following the median line of the tape, a second tape of impervious synthetic material, and said first and second tapes being superimposed and fastened together.

4. In an electrical high-power cable having a central conductor and insulating means comprising a plurality of layers of a composite tape wrapped helically around said conductor in such a manner that a joint exists between two consecutive turns of the composite tape, the improvement essentially consisting of a composite tape assembly including a first tape of impervious synthetic material having essentially oblong notches disposed obliquely to the axis of said first tape, each of said notches being extended to one of the edges of the tape, said first tape being substantially uninterrupted within the area of a longitudinal central part substantially following the median line of the tape, a second tape of impervious synthetic material, said first and second tapes being superimposed and bonded together, and said composite tape being wound around the conductor with an offset of one layer relative to the other so that said central part does not overlap onto the joint of a neighboring layer.

5. In an electrical high-power cable having a central conductor and insulating means comprising a plurality of layers of a composite tape wrapped helically around said conductor in such a manner that a joint exists between two consecutive turns of the composite tape, the improvement essentially consisting of a composite tape assembly including a first tape of impervious synthetic material having essentially oblong notches disposed obliquely to the axis of said first tape, all of said notches being extended to the same edge of said first tape, a second tape of impervious synthetic material, and said first and second tapes being superimposed and fastened together.

6. In an electrical high-power cable having a central conductor and insulating means comprising a plurality of layers of a composite tape wrapped helically around said conductor in such a manner that a joint exists between two consecutive turns of the composite tape, the improvement essentially consisting of a composite tape assembly including a first tape of impervious synthetic material having essentially oblong notches disposed obliquely to the axis of said first tape, each of said notches being extended to one of the edges of the tape, said first tape being devoid of any notches within the area of a longitudinal central part substantially following the median line of the tape, the notches situated at one side of said central part being parallel to a given direction, the notches situated at the other side of said central part being parallel to another direction, a second tape of impervious synthetic material, said first and second tapes being superimposed and fastened together, and said composite tape being wound around the conductor with an offset of one layer relative to the other so that said central part does not overlap onto the joint of a neighboring layer.

7. In an electrical high-power cable having a central conductor and insulating means comprising a plurality of layers of a composite tape wrapped helically around said conductor in such a manner that a joint exists between two consecutive turns of the composite tape, the improvement essentially consisting of a composite assembly tape including a first tape of impervious synthetic material having essentially oblong notches disposed obliquely to the axis of said first tape, each of said notches being extended to one of the edges of the tape, a second tape of impervious synthetic material, said first and second tapes being superimposed and secured together, said first tape further having a thickness at most equal to that of said second tape, the width of the notches being at most equal to that of the joint between two consecutive turns of the composite tape.

8. In an electrical high-power cable having a central conductor and insulating means comprising a plurality of layers of a composite tape wrapped helically around said conductor in such a manner that a joint exists between two consecutive turns of the composite tape, the improvement essentially consisting of a composite tape structure including a first tape of impervious synthetic material having essentially oblong notches disposed obliquely to the axis of said first tape, each of said notches being extended to one of the edges of the tape, and said first tape being uninterrupted and thus devoid of notches within the area of a longitudinal central part substantially following the median line of the tape, a second tape of impervious synthetic material, and said first and second tapes being superimposed and fastened together, said first tape further having a thickness at most equal to that of said second tape, the width of the notches being at most equal to that of the joint between two consecutive turns of the composite tape.

9. In an electrical high-power cable having a central conductor and insulating means comprising a plurality of layers of a composite tape wrapped helically around said conductor in such a manner that a joint exists between two consecutive turns of the composite tape, the improvement essentially consisting of a composite tape assembly including a first tape of impervious synthetic material having essentially oblong notches disposed obliquely to the axis of said first tape, each of said notches being extended to one of the edges of the tape, said first tape being substantially uninterrupted within the area of a longitudinal central part substantially following the median line of the tape, a second tape of impervious synthetic material, said first and second tapes being superimposed and bonded together, and said composite tape being wound around the conductor with an offset of one layer relative to the other so that said central part does not overlap onto the joint of a neighboring layer, said first tape further having a thickness at most equal to that of said second tape, the width of the notches being at most equal to that of the joint between two consecutive turns of the composite tape.

10. In an electrical high-power cable having a central conductor and insulating means comprising a plurality of layers of a composite tape wrapped helically around said conductor in such a manner that a joint exists between two consecutive turns of the composite tape, the improvement essentially consisting of a composite tape assembly including a first tape of impervious synthetic material having essentially oblong notches disposed obliquely to the axis of said first tape, all of said notches being extended to the same edge of said first tape, a second tape of impervious synthetic material, and said first and second tapes being superimposed and fastened together, said first tape further having a thickness at most equal to that of said second tape, the width of the notches being at most equal to that of the joint between two consecutive turns of the composite tape.

11. In an electrical high-power cable having a central conductor and insulating means comprising a plurality of layers of a composite tape wrapped helically around said conductor in such a manner that a joint exists between two consecutive turns of the composite tape, the improvement essentially consisting of a composite tape assembly including a first tape of impervious synthetic material having essentially oblong notches disposed obliquely to the axis of said first tape, each of said notches being extended to one of the edges of the tape, said first tape being devoid of any notches within the area of a longitudinal central part substantially following the median line of the tape, the notches situated at one side of said central part being parallel to a given direction, the notches situated at the other side of said central part being parallel to another direction, a second tape of impervious synthetic material, said first and second tapes being superimposed and fastened together, and said composite tape being wound around the conductor with an offset of one layer relative to the other so that said central part does not overlap onto the joint of a neighboring layer, said first tape further having a thickness at most equal to that of said second tape, the width of the notches being at most equal to that of the joint between two consecutive turns of the composite tape.

12. A method for making an electrical high-power cable having a central conductor and insulating means comprising a plurality of layers of a composite tape wrapped helically around said conductor in such a manner that a joint exists between two consecutive turns of the composite tape, said composite tape being provided with ducts having at least an outlet in said joint, the width of said ducts being at most equal to that of said joint, comprising the steps of cutting notches in a first tape of impervious synthetic material, superimposing said first tape on a second uninterrupted tape of impervious synthetic material and bonding said first and said second tapes together to form a composite tape and wrapping said composite tape helically about said central conductor.

References Cited by the Examiner

UNITED STATES PATENTS

| | | | |
|---|---|---|---|
| 1,979,150 | 10/1934 | Emanueli. | |
| 3,077,510 | 2/1963 | Olds | 174—120 X |
| 3,077,514 | 2/1963 | Kang | 174—120 |
| 3,078,333 | 2/1963 | Kang | 174—120 |

FOREIGN PATENTS 1,151,763   8/1957   France.

LARAMIE E. ASKIN, *Primary Examiner.*

JOHN F. BURNS, *Examiner.*